US012803794B2

(12) United States Patent
Cho et al.

(10) Patent No.: US 12,803,794 B2
(45) Date of Patent: Nov. 17, 2026

(54) ELECTRONIC DEVICE AND METHOD FOR DISTRIBUTING SECRET KEYS THEREOF

(71) Applicants: CRYPTO LAB INC., Seoul (KR); Seoul National University R&DB Foundation, Seoul (KR)

(72) Inventors: Wonhee Cho, Suwon-si (KR); Jung Hee Cheon, Seoul (KR)

(73) Assignees: CRYPTO LAB INC., Seoul (KR); Seoul National University R&DB Foundation, Seoul (KR)

( * ) Notice: Subject to any disclaimer, the term of this patent is extended or adjusted under 35 U.S.C. 154(b) by 373 days.

(21) Appl. No.: 18/588,413

(22) Filed: Feb. 27, 2024

(65) Prior Publication Data

US 2024/0323002 A1 Sep. 26, 2024

(30) Foreign Application Priority Data

Feb. 28, 2023 (KR) .................. KR10-2023-0027008
Feb. 26, 2024 (KR) .................. KR10-2024-0027309

(51) Int. Cl.
*H04L 9/08* (2006.01)
*H04L 9/00* (2022.01)

(52) U.S. Cl.
CPC .............. *H04L 9/085* (2013.01); *H04L 9/008* (2013.01); *H04L 9/0819* (2013.01)

(58) Field of Classification Search
CPC ....... H04L 9/085; H04L 9/008; H04L 9/0819; H04L 2209/122
USPC .......................................................... 380/278
See application file for complete search history.

(56) References Cited

U.S. PATENT DOCUMENTS

| | | | | |
|---|---|---|---|---|
| 8,837,738 | B2 * | 9/2014 | Huang | H04L 9/0836 380/281 |
| 10,630,477 | B1 * | 4/2020 | Ju | H04L 9/3066 |
| 11,201,735 | B2 * | 12/2021 | Cheon | H04L 9/0618 |
| 11,736,450 | B2 * | 8/2023 | Mandal | H04L 63/0421 713/168 |
| 2008/0181413 | A1 * | 7/2008 | Yi | H04L 9/302 380/279 |
| 2020/0184086 | A1 * | 6/2020 | Bishop | H04L 9/0861 |

FOREIGN PATENT DOCUMENTS

| | | | | |
|---|---|---|---|---|
| EP | 0635956 B1 * | 10/2003 | | H04L 9/0668 |
| GB | 2610560 A * | 3/2023 | | H04L 9/3255 |
| WO | WO-2008127309 A2 * | 10/2008 | | H04L 9/3231 |
| WO | WO-2019193452 A1 * | 10/2019 | | H04L 9/3247 |

* cited by examiner

*Primary Examiner* — Bryan F Wright
(74) *Attorney, Agent, or Firm* — FBT Gibbons LLP

(57) ABSTRACT

An electronic device and a method for distributing a secret key are disclosed. A secret key corresponding to a level is divided into secret shares according to a secret sharing scheme. Secret shares generated at each level are repeatedly divided to form lower-level secret shares in a tree-based secret sharing structure, and final-level secret shares are provided to a plurality of electronic devices. The secret sharing scheme may be based on Shamir's s-out-of-(2s−1) secret sharing scheme and may be used for a secret key of a homomorphically encrypted message, thereby reducing communication cost for decryption.

10 Claims, 7 Drawing Sheets

ELECTRONIC DEVICE AND METHOD FOR DISTRIBUTING SECRET KEYS THEREOF

CROSS-REFERENCE TO RELATED APPLICATION (S)

This application is based on and claims priority under 35 U.S.C. § 119 to Korean Patent Application No. 10-2023-0027008, filed on Feb. 28, 2023, and Korean Patent Application No. 10-2024-0027309, filed on Feb. 26, 2024, in the Korean Intellectual Property Office, the disclosure of which is incorporated by reference herein in its entirety.

BACKGROUND

1. Field

The present disclosure relates to an electronic device and a method for distributing secret keys thereof, and more particularly, to an electronic device which may distribute secret keys of a homomorphically encrypted message by using a secret sharing scheme, and a method for distributing secret keys thereof.

2. Description of Related Art

In accordance with the development of communication technology and a growing spread of electronic devices, efforts are made continuously being to maintain communication security between the electronic devices. Accordingly, encryption/decryption technology is used in most communication environments.

In case that a message encrypted by the encryption technology is delivered to the other party, the other party may be required to perform decryption to use the message. In this case, the other party may waste resources and time in a process of decrypting the encrypted data. In addition, the message may be easily leaked to a third party in case that the message temporarily decrypted by the other party for calculation is hacked by the third party.

A homomorphic encryption method is being studied to solve this problem. The homomorphic encryption method may obtain the same result as a value encrypted after performing the calculation on a plaintext even in case that the calculation is performed on an encrypted message itself without decrypting the encrypted data. Therefore, various calculations may be performed without decrypting the encrypted message.

Meanwhile, various schemes exist to segment a secret key into several and distribute the same to a plurality of people to ensure safety. This scheme may required a higher communication cost for the decryption due to the large number of partial secret keys distributed to one party, or a large size of the partial secret key.

SUMMARY

The present disclosure provides an electronic device which may distribute secret keys by using a secret sharing scheme with an efficient communication cost, and a method for distributing secret keys thereof.

According to an embodiment of the present disclosure, provided is an electronic device which distributes secret keys by using a t-out-of-N secret sharing scheme, the device including: a communication device; a memory storing the secret key; and a processor configured to generate a plurality of secret shares corresponding to a level of 1 by segmenting the secret key corresponding to a level of zero based on a predetermined secret sharing scheme, generate a plurality of secret shares corresponding to a level of L by repeatedly performing a process of generating a plurality of secret shares corresponding to a next level by segmenting the plurality of secret shares each corresponding to the respective levels ranging from the level of 1 based on the predetermined secret sharing scheme, and transmit the plurality of secret shares corresponding to the level of L to N electronic devices through the communication device.

The predetermined secret sharing scheme may be Shamir's secret sharing scheme of s-out-of-(2s−1).

$$L \geq \log_{c_s}(N) + \log_s(N) + O(1),$$

and here, $$c_s = \frac{2s-1}{2^{2s-2}} \cdot \binom{2s-2}{s-1}.$$

The secret key may be a secret key of a homomorphically encrypted message.

Each of t electronic devices among the N electronic devices may transmit the secret share including an error to the electronic device, and the processor may be configured to receive the plurality of secret shares each including the error from the t electronic devices through the communication device, and decrypt the homomorphically encrypted message based on the received plurality of secret shares.

According to an embodiment of the present disclosure, provided is a method for distributing secret keys in which a t-out-of-N secret sharing scheme is used, the method including: generating a plurality of secret shares corresponding to a level of 1 by segmenting a secret key corresponding to a level of zero based on a predetermined secret sharing scheme; generating a plurality of secret shares corresponding to a level of L by repeatedly performing a process of generating a plurality of secret shares corresponding to a next level by segmenting the plurality of secret shares each corresponding to the respective levels ranging from the level of 1 based on the predetermined secret sharing scheme; and transmitting the plurality of secret shares corresponding to the level of L to N electronic devices.

The predetermined secret sharing scheme may be Shamir's secret sharing scheme of s-out-of-(2s−1).

$$L \geq \log_{c_s}(N) + \log_s(N) + O(1),$$

and here, $$c_s = \frac{2s-1}{2^{2s-2}} \cdot \binom{2s-2}{s-1}.$$

The secret key may be a secret key of a homomorphically encrypted message.

The method, in which each of t electronic devices among the N electronic devices transmits the secret share including an error to the electronic device, may further include receiving the plurality of secret shares each including the error from the t electronic devices, and decrypting the homomorphically encrypted message based on the received plurality of secret shares.

As described above, according to the various embodiments of the present disclosure, it is possible to provide the compact encrypted message, and lower the communication cost for the decryption.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
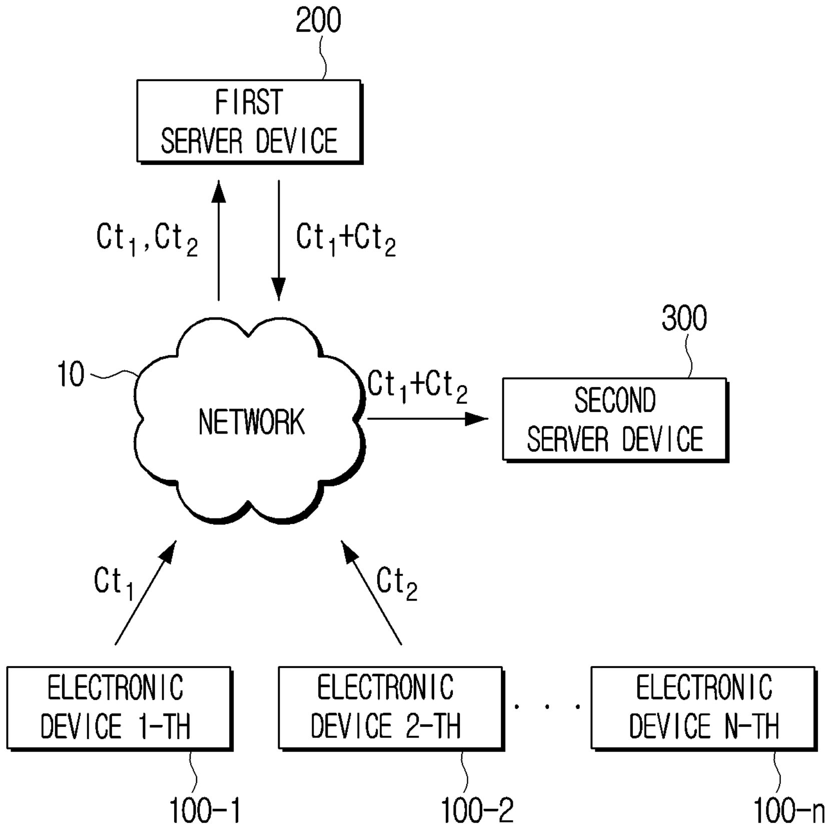
FIG. 1 is a view for explaining a structure of a network system according to an embodiment of the present disclosure.

Hereinafter, the present disclosure is described in detail with reference to the accompanying drawings. Encryption/decryption may be applied as necessary to a process of transmitting data that is performed in the present disclosure, and an expression describing the process of transmitting the data in the present disclosure and the claims should be interpreted as including cases of the encryption/decryption even if not separately mentioned. In the present disclosure, an expression such as "transmission/transfer from A to B" or "reception from A to B" may include transmission/transfer or reception while having another medium included in the middle, and may not necessarily express only the direct transmission/transfer or reception from A to B.

In describing the present disclosure, a sequence of each operation should be understood as non-restrictive unless a preceding operation in the sequence of each operation needs to logically and temporally precede a subsequent operation. That is, except for the above exceptional case, the essence of the present disclosure is not affected even though a process described as the subsequent operation is performed before a process described as the preceding operation, and the scope of the present disclosure should also be defined regardless of the sequence of the operations. In addition, in the specification, "A or B" may be defined to indicate not only selectively indicating either one of A and B, but also including both A and B. In addition, a term "including" in the present disclosure may have a meaning encompassing further including other components in addition to components listed as being included.

The present disclosure only describes essential components necessary for describing the present disclosure, and does not mention components unrelated to the essence of the present disclosure. In addition, it should not be interpreted as an exclusive meaning that the present disclosure includes only the mentioned components, but should be interpreted as a non-exclusive meaning that the present disclosure may include other components as well.

In addition, in the present disclosure, a "value" may be defined as a concept that includes a vector as well as a scalar value. In addition, in the present disclosure, an expression such as "calculate" or "compute" may be replaced with an expression of generating a result of the corresponding calculation or computation. In addition, unless otherwise specified, an operation on an encrypted message described below indicates a homomorphic operation. For example, addition of homomorphically encrypted messages may indicate homomorphic addition of two homomorphically encrypted messages.

Mathematical operations and calculations of each step in the present disclosure described below may be implemented as computer operations by a known coding method and/or coding designed to be suitable for the present disclosure to perform the operations or calculations.

A term of a singular number may include its plural number unless explicitly indicated otherwise.

Specific equations described below are exemplarily described among possible alternatives, and the scope of the present disclosure should not be construed as being limited to the equations mentioned in the present disclosure.

For convenience of explanation, the present disclosure defines the following notations.

$a \leftarrow D$: Select an element a according to distribution D.

$s_1, s_2 \in R$: Each of $s_1$ and $s_2$ is an element belonging to a set R.

mod (q): Perform modular calculation with an element q.

$\lfloor \cdot \rceil$: Round an internal value.

O( ): Big-O notation.

$$\binom{a}{b}: {}_aC_b.$$

Hereinafter, various embodiments of the present disclosure are described in detail with reference to the accompanying drawings.

FIG. 1 is a view for explaining a structure of a network system according to an embodiment of the present disclosure.

Referring to FIG. 1, the network system may include a plurality of electronic devices 100-1 to **100-*n*, a first server device 200, and a second server device 300, and the respective devices may be connected to each other through a network 10**.

The network 10 may be implemented in any of various types of wired and wireless communication networks, broadcast communication networks, optical communication networks, cloud networks, or the like, and the respective devices may be connected to each other in a way such as wireless fidelity (WiFi), Bluetooth, near field communication (NFC), or the like without a separate medium.

Although FIG. 1 shows the plurality of electronic devices 100-1 to **100-*n*, the plurality of electronic devices are not necessarily used, and one device may be used. For example, the electronic devices 100-1 to 100-*n*** may be implemented in various types of devices such as smartphones, tablets, game players, personal computers (PCs), laptop PCs, home servers, or kiosks, and may also be implemented in other types of home appliances each having an Internet of things (IoT) functions.

A user may input various data through the electronic devices 100-1 to **100-*n* used by the user. The input data may be stored in the electronic devices 100-1 to 100-*n* themselves, or may also be transmitted and stored in an external electronic device for storage capacity, a security reason or the like. In FIG. 1, the first server device 200 may serve to store the information, and the second server device 300 may serve to use some or all of the information stored in the first server device 200**.

Each of the electronic devices 100-1 to **100-*n* may homomorphically encrypt the input information and transmit a homomorphically encrypted message to the first server device 200**.

Each of the electronic devices 100-1 to **100-*n* may include an error, that is, encryption noise calculated in a process of performing homomorphic encryption, in the encrypted message. In detail, the homomorphically encrypted message generated by each of the electronic devices 100-1 to 100-*n*** may be generated for a result value including the message and an error value to be restored in case that the encrypted message is later decrypted using a secret key.

As an example, the homomorphically encrypted message generated by each of the electronic devices 100-1 to **100-*n*** may be generated to satisfy the following feature shown in Equation 1 below in case of being decrypted using the secret key.

$$Dec(ct, sk) = \langle ct, sk \rangle = M + e (\text{mod}\, q). \quad \text{[Equation 1]}$$

Here, < and > indicate dot product calculation (or usual inner product), ct indicates the encrypted message, sk indicates the secret key, M indicates a plaintext message, e indicates the encryption error value, and mod q indicates a modulus of the encrypted message. q needs to be chosen larger than the result value M multiplied by a scaling factor Δ to the message. In case that an absolute value of the error value e is sufficiently smaller than M, a decryption value M+e of the encrypted message may be a value that may replace an original message by the same precision in significant figure calculation. Among decrypted data, the error may be disposed on the least significant bit (LSB) side, and M may be disposed on the next least significant bit side.

In case that a size of the message is too small or too large, the size may be adjusted using the scaling factor. In case that the scaling factor is used, not only a message in an integer form but also a message in a real number form may be encrypted, and its usability may thus be greatly increased. In addition, the size of the message may be adjusted using the scaling factor to thus also adjust a size of an effective region, that is, a region where the messages exist in the encrypted message after the calculation is performed.

In some embodiments, the modulus q of the encrypted message may be set and used in various forms. As an example, the modulus of the encrypted message may be set in a form of an exponential power $q=\Delta^L$ of the scaling factor Δ. In case that Δ is 2, the modulus may be set to a value such as $q=2^{10}$.

In addition, the homomorphically encrypted message according to the present disclosure is described assuming that a fixed point is used. However, the homomorphically encrypted message may also be applied even in case of using a floating point.

The first server device 200 may store the received homomorphically encrypted message as the encrypted message without decrypting the same.

The second server device 300 may request a specific processing result for the homomorphically encrypted message from the first server device 200. The first server device 200 may perform a specific calculation based on the request of the second server device 300 and then transmit its result to the second server device 300.

As an example, encrypted messages ct1 and ct2 transmitted by two electronic devices 100-1 and 100-2 may be stored in the first server device 200. In this case, the second server device 300 may request the first server device 200 for the sum of information provided from the two electronic devices 100-1 and 100-2. The first server device 200 may perform a calculation of summing the two encrypted messages based on the request, and then transmit a result value ct1+ct2 to the second server device 300.

Due to a nature of the homomorphically encrypted message, the first server device 200 may perform the calculation without the decryption, and the result value may also be in a form of the encrypted message. In the present disclosure, the result value acquired by the calculation is referred to as a calculation-result encrypted message.

The first server device 200 may transmit the calculation-result encrypted message to the second server device 300. The second server device 300 may decrypt the received calculation-result encrypted message and obtain the calculation result value of the data included in each of the homomorphically encrypted messages.

The first server device 200 may perform the calculation several times based on a user request. In this case, an approximate message proportion in the calculation-result encrypted message obtained for each calculation may be different. The first server device 200 may perform a bootstrapping operation in case that the approximate message proportion is more than a threshold. The first server device 200 may be referred to as a calculation device in capable of performing the calculation operation in this way.

In detail, in Equation 1 above, M+e (mod q) has a different value from M+e if q is smaller than M, and it is thus impossible decrypt M+e (mod q). Therefore, a value of q requires to always be greater than M. However, the value of q may be gradually decreased as the calculation progresses. Therefore, an operation may be required to change the value of q for the value of q to always be greater than M, and this operation may be referred to as the bootstrapping operation. The encrypted message may be calculated again as the bootstrapping operation is performed.

Meanwhile, FIG. 1 shows a case where the first electronic device and the second electronic device perform the encryption, and the second server device performs the decryption, and the present disclosure is not necessarily limited thereto.

Figure 2:
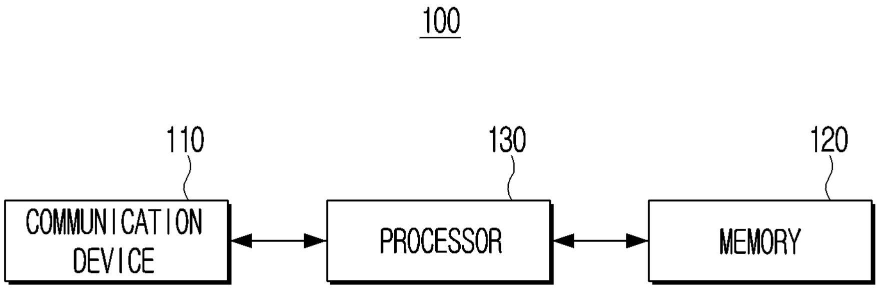
FIG. 2 is a block diagram showing a configuration of an electronic device according to an embodiment of the present disclosure.

FIG. 2 is a block diagram showing a configuration of the electronic device according to an embodiment of the present disclosure.

Referring to FIG. 2, the electronic device 100 may include a communication device 110, a memory 120, and a processor 130.

The communication device 110 may perform data communication with the external electronic device under control of the processor 130. The external electronic devices may include the servers, the smartphones, the tablets, the game players, the PCs, the laptop PCs, the home servers, the kiosks, the home appliances each having the IoT function, and the like.

The communication device 110 may connect the electronic device 100 to the external electronic device. For example, the electronic device 100 may be connected to the external electronic device through a local area network (LAN) or an Internet network, or may be connected to the external electronic device through a Universal Serial Bus (USB) port or wireless communication (e.g., WiFi 802.11a/b/g/n, NFC, or Bluetooth) port. The communication device 110 may also be referred to as a transceiver.

For example, the communication device 110 may include a communication circuit capable of performing data communication between the electronic device 100 and the external electronic device by using at least one of data communication methods including wired LAN, wireless LAN, WiFi, Bluetooth, ZigBee, WiFi direct (WFD), infrared data association (IrDA), Bluetooth low energy (BLE), near field communication (NFC), wireless broadband internet (Wibro), world interoperability for microwave access (WiMAX), shared wireless access protocol (SWAP), wireless gigabit alliances (WiGig) or radio frequency (RF) communication.

The communication device 110 may receive a public key from the external electronic device, and may transmit the public key generated by the electronic device 100 to the external electronic device.

The communication device 110 may receive the message from the external electronic device and transmit the generated homomorphically encrypted message to the external electronic device. In addition, the communication device 110 may receive various parameters required to generate the encrypted message from the external electronic device.

The memory 120 may be a component for storing various instructions and/or software, data, or the like related to an operating system (O/S) for driving the electronic device 100 or the generation and calculation processing of the homomorphically encrypted message described below. The memory 120 may be implemented in various forms such as a random access memory (RAM), read-only memory (ROM), a flash memory, a hard disk drive (HDD), an external memory, or a memory card, and is not limited to any one of these forms.

The memory 120 may store the message to be encrypted. For example, the message may be the various credit information, personal information or the like of the user, and may be information related to a usage history such as location information or internet usage time information, used by the electronic device 100. However, the present disclosure is not limited thereto, and the message may include a variety of information.

The memory 120 may store the public key. In addition, in case that the electronic device 100 is a device that directly generates the public key, the memory 120 may store not only the secret key but also the various parameters necessary for generating the public key and the secret key.

In addition, the memory 120 may store the homomorphically encrypted message generated in a process described below.

The processor 130 may control overall operations of the electronic device 100. For example, the processor 130 may execute one or more instructions stored in the memory 120, thereby controlling the overall operations of the electronic device 100 for generating and decrypting the homomorphically encrypted message and distributing the secret keys based on a secret sharing scheme.

The processor 130 may include one device such as a central processing unit (CPU) or an application-specific integrated circuit (ASIC), or may include a plurality of devices such as the CPU and a graphics processing unit (GPU).

In case of receiving the message to be transmitted, the processor 130 may store the message in the memory 120. In addition, the processor 130 may homomorphically encrypt the message by using various setting values and programs stored in the memory 120. In this case, the processor 130 may use the public key.

The processor 130 may generate and use the public key necessary to perform the encryption on its own, or may receive the public key from the external electronic device and use the same. As an example, the second server device 300 performing the decryption may distribute the public key to other devices.

In case of generating the key on its own, the processor 130 may generate the public key by using a ring-LWE scheme. In detail, the processor 130 may first set the various parameters and rings, and store the same in the memory 120. An example of the parameter may include the bit length, dimension k, or rank k of the plaintext message, and sizes of the public key and the secret key. The homomorphically encrypted message may have various formats, and the processor 130 may set the ring based on an encrypted message method based on a method set by the user or a predetermined method. For example, the homomorphically encrypted message method described above may be a CKKS scheme, a RLWE scheme, or the like.

The ring may be expressed as Equation 2 below.

$$R = Z_q[X]/f(x).$$ [Equation 2]

Here, R indicates the ring, $Z_q$ indicates a coefficient, and f(x) indicates an N-th polynomial.

The Ring g indicates a set of polynomials having predetermined coefficients, and indicates the set in which addition and multiplication are defined between elements and which is closed for the addition and multiplication. The Ring may be referred to as the ring.

As an example, the ring indicates a set of the N-th polynomials with the coefficient $Z_q$. In detail, in case that n is Φ(N), the polynomial indicates a polynomial which may be calculated as the remainder of dividing the polynomial by an N-th cyclotomic polynomial. f(x) indicates ideal of $Z_q[x]$ generated by f(x). The Euler totient function Φ(N) indicates the number of natural numbers that are prime to N and smaller than N. If ΦN(x) is defined as the n-th cyclotomic polynomial, the ring may also be expressed in Equation 3 as follows.

$$R = Z_q[X]/\Phi_N(x).$$ [Equation 3]

In case that the ring is set, the processor 130 may calculate a secret key sk from the ring, as shown in Equation 4 below.

$$sk \leftarrow (1, s(x)), s(x) \in R.$$ [Equation 4]

Here, s(x) indicates a random polynomial generated using a small coefficient.

In case that the ring and the secret key are selected, the processor 130 may calculate a first random polynomial a(x) from the ring. The first random polynomial may be expressed as follows.

$$a(x) \leftarrow R. \quad \text{[Equation 5]}$$

In addition, the processor 130 may calculate the error. In detail, the processor 130 may extract the error from a discrete Gaussian distribution or a distribution having a statistical distance close thereto. The error may be expressed as Equation 6 below.

$$e(x) \leftarrow D^n_{\alpha q}. \quad \text{[Equation 6]}$$

In case that even the error is calculated, the processor 130 may calculate a second random polynomial by modularly calculating the error on the first random polynomial and the secret key. The second random polynomial may be expressed as Equation 7 below.

$$b(x) = -a(x)s(x) + e(x) \pmod q. \quad \text{[Equation 7]}$$

Finally, a public key pk may be set to include the first random polynomial and the second random polynomial, as shown in Equation 8 below.

$$pk = (b(x), a(x)). \quad \text{[Equation 8]}$$

The method for generating the key described above is only an example, the present disclosure is not necessarily limited thereto, and the public key and the secret key may be generated by another method.

The processor 130 may generate the homomorphically encrypted message for the message. In detail, the processor 130 may generate the homomorphically encrypted message by applying the public key previously generated to the message. Here, the processor 130 may generate a length of the encrypted message to correspond to a size of the scaling factor.

For example, the processor 130 may generate the secret key and the public key based on the various parameters. In addition, if it is necessary to generate the encrypted message for the message, the processor 130 may generate the homomorphically encrypted message by applying the public key to the message. For example, the processor 130 may convert the message to a polynomial form, and generate the homomorphically encrypted message by applying the public key to the converted message in the polynomial form.

The processor 130 may store the generated homomorphically encrypted message in the memory 120. In addition, the processor 130 may control the communication device 110 to transmit the homomorphically encrypted message to another electronic device based on the user request or a predetermined default command.

The processor 130 may generate the message by decrypting the homomorphically encrypted message. For example, in case that the homomorphically encrypted message is required to be decrypted, the processor 130 may apply the secret key to the homomorphically encrypted message to thus generate a decrypted message in the polynomial form, and may generate the message by decoding the decrypted message in the polynomial form. Here, the generated message may include the error as mentioned in Equation 1 described above.

In addition, the processor 130 may perform the calculation on the encrypted message. In this case, the processor 130 may perform the calculation such as the addition or the multiplication on the homomorphically encrypted message while maintaining its encryption state. For example, in case that the calculation for the homomorphically encrypted message is necessary, the processor 130 may perform the addition or multiplication calculation for the plurality of the homomorphically encrypted messages requested by the user.

As described above, the electronic device 100 according to this embodiment may generate the homomorphically encrypted message, thus improving stability of the message even when calculation is required. In addition, the homomorphically encrypted message generated may include the error, thus maintaining stable security even for biometric information that requires high security.

Meanwhile, in case that the calculation is completed, the processor 130 may detect data in the effective region from calculation result data. In detail, the processor 130 may detect the data in the effective region by performing rounding processing on the calculation result data. The rounding processing indicates rounding off the message in the encryption state, and may also be referred to as rescaling.

In detail, the processor 130 may remove a noise region by multiplying each component of the encrypted message by $\Delta^{-1}$, which is a reciprocal of the scaling factor, and rounding the same. The noise region may be determined to correspond to the size of the scaling factor. As a result, the message in the effective region excluding the noise region may be detected. An additional error may occur because the process is performed in the encryption state. However, this error may be ignored because its size is sufficiently small.

Figure 3:
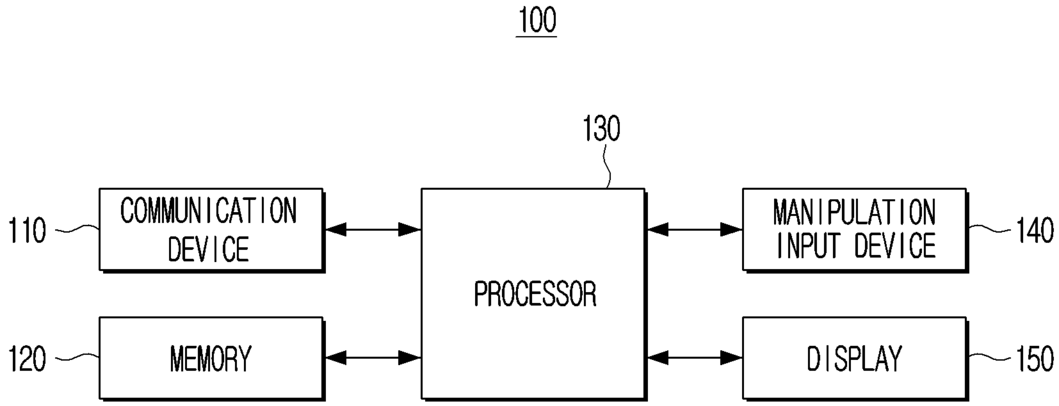
FIG. 3 is a block diagram showing a specific configuration of the electronic device according to an embodiment of the present disclosure.

FIG. 3 is a block diagram showing a specific configuration of the electronic device according to an embodiment of the present disclosure.

Referring to FIG. 3, the electronic device 100 may include the communication device 110, the memory 120, the processor 130, a manipulation input device 140, and a display 150. However, this configuration is an example, and a new configuration may be added to or some configuration may be omitted from this configuration in case that the present disclosure is performed. Meanwhile, the description omits a detailed description of components overlapping the components shown in FIG. 2 among the components shown in FIG. 3.

The manipulation input interface 140 may receive, from the user, selection of a function of the electronic device 100 and a control command for the corresponding function. For example, the manipulation input device 140 may receive, from the user, the parameter required to generate the secret key or the public key. In addition, the manipulation input device 140 may receive the message to be encrypted from the user.

The manipulation interface 140 may include various types of input devices. For example, the manipulation input device 140 may be implemented as a keyboard, a mouse, a touch screen, or the like.

The display 150 may display a user interface window for selection of a function supported by the electronic apparatus 100. For example, the display 150 may display the user interface window for selection of various functions provided by the electronic device 100. The display 150 may be a monitor such as a liquid crystal display (LCD), a cathode ray tube (CRT), or an organic light-emitting diode (OLED), and may be implemented as the touch screen which may simultaneously perform the functions of the manipulation input device 140.

The display 150 may display a message requesting an input of the parameter required to generate the secret key or the public key. In addition, the display 150 may display a message for selecting the message to be encrypted. Meanwhile, the encryption target may be implemented to be directly selected by the user or automatically selected. That is, the personal information that requires the encryption may be automatically set even though the user does not directly select the message.

The description describes in detail specific operations in which the electronic device 100 distributes the secret keys by using a t-out-of-N secret sharing scheme with reference to the drawings and descriptions provided below.

The t-out-of-N secret sharing scheme according to the present disclosure may be provided by repeating Shamir's secret sharing scheme of s-out-of-(2s−1), and may have a tree structure. Therefore, the t-out-of-N secret sharing scheme may be referred to as a tree-secret sharing scheme (TreeSSS) (or a t-out-of-N TreeSSS).

In addition, the secret key may be the secret key of the homomorphically encrypted message. A threshold fully homomorphic encryption (TFHE) that is based on the t-out-of-N secret sharing scheme according to the present disclosure may distribute the secret keys of the homomorphically encrypted message by using the t-out-of-N secret sharing scheme. The TFHE that is based on the t-out-of-N secret sharing scheme may be a cryptosystem for distributing the secret keys to N parties. The party may be replaced with an expression such as a participant for example. In this system, t or more parties may be required to cooperate with each other to obtain the plaintext from the homomorphically encrypted message, and information on the plaintext is unable to be obtained even in case that t−1 parties or fewer parties cooperate with each other.

Figure 4:
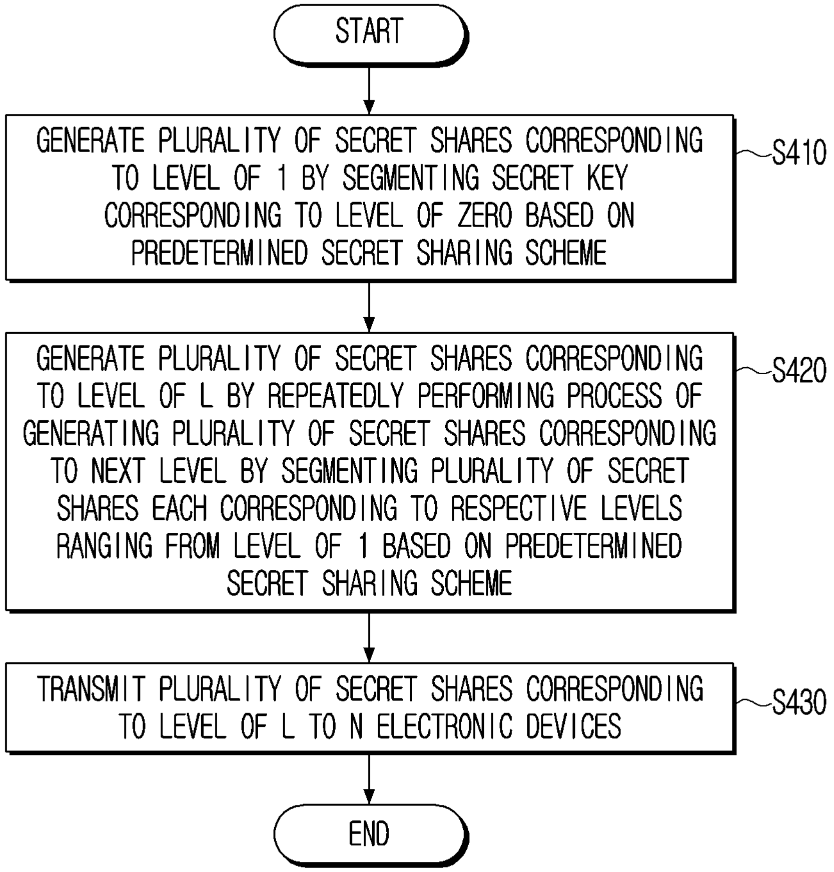
FIG. 4 is a flow chart for explaining a method for distributing secret keys by using a t-out-of-N secret sharing scheme according to an embodiment of the present disclosure.

FIG. 4 is a flow chart for explaining a method for distributing secret keys by using the t-out-of-N secret sharing scheme according to an embodiment of the present disclosure.

In operation S410, the processor 130 may generate a plurality of secret shares corresponding to a level of 1 by segmenting the secret key corresponding to a level of zero based on a predetermined secret sharing scheme. For example, the secret key may be the secret key of the homomorphically encrypted message.

In operation S420, the processor 130 may generate a plurality of secret shares corresponding to a level of L by repeatedly performing a process of generating a plurality of secret shares corresponding to a next level by segmenting the plurality of secret shares each corresponding to the respective levels ranging from the level of 1 based on the predetermined secret sharing scheme.

The secret share may be a partial secret key, and may be replaced with an expression such as a piece or a share, for example.

The predetermined secret sharing scheme may be Shamir's secret sharing scheme of s-out-of-(2s−1). Here, s<<N.

In addition, L indicates the iteration number. As an example, $$L \geq \log_{c_s}(N) + \log_s(N) + O(1),$$

and here, $$c_s = \frac{2s-1}{2^{2s-2}} \cdot \binom{2s-2}{s-1}.$$

That is, in the present disclosure, the processor 130 may generate a secret share corresponding to a level of (i) from a secret share corresponding to a level of (i−1) (here, 1≤i≤L) by applying Shamir's secret sharing scheme of s-out-of-(2s−1), and repeatedly apply Shamir's secret sharing scheme of s-out-of-(2s−1) until obtaining the secret share corresponding to the level of L. Accordingly, the processor 130 may generate the secret share corresponding to the level of L from the secret key corresponding to a level of zero.

Segmenting the secret shares by using Shamir's secret sharing scheme of s-out-of-(2s−1) may be expressed as Equation 9 below.

$$\begin{bmatrix} sk_1^{(i)} \\ sk_2^{(i)} \\ \vdots \\ sk_{2s-1}^{(i)} \end{bmatrix} = \begin{bmatrix} 1 & 1 & \ldots & 1 \\ 1 & 2 & \ldots & 2^{s-1} \\ 1 & (2s-1) & \ldots & (2s-1)^{s-1} \end{bmatrix} \cdot \begin{bmatrix} sk^{(i-1)} \\ r_1 \\ \vdots \\ r_{s-1} \end{bmatrix}. \quad \text{[Equation 9]}$$

Here, $sk^{(i-1)}$ indicates the secret share corresponding to the level of (i−1), and $sk^{(i)}$ indicates the secret share corresponding to the level of (i). In addition, r1, . . . , and rs−1 indicate randomly selected coefficients.

Figure 5:
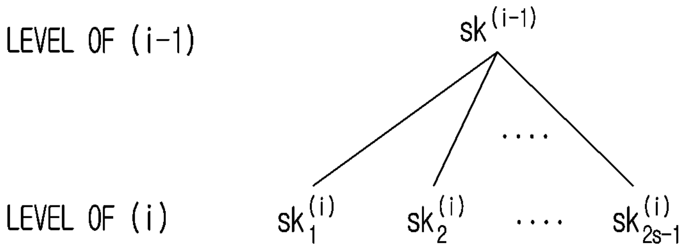
FIG. 5 is a view for explaining a Shamir's secret sharing scheme of s-out-of-(2s−1).

Referring to Equation 9 and FIG. 5, the processor 130 may use Shamir's secret sharing scheme of s-out-of-(2s−1) to thus segment the secret share corresponding to the level of (i−1) into 2s−1 secret shares, thereby generating the 2s−1 secret shares corresponding to the level of (i).

Figure 6:
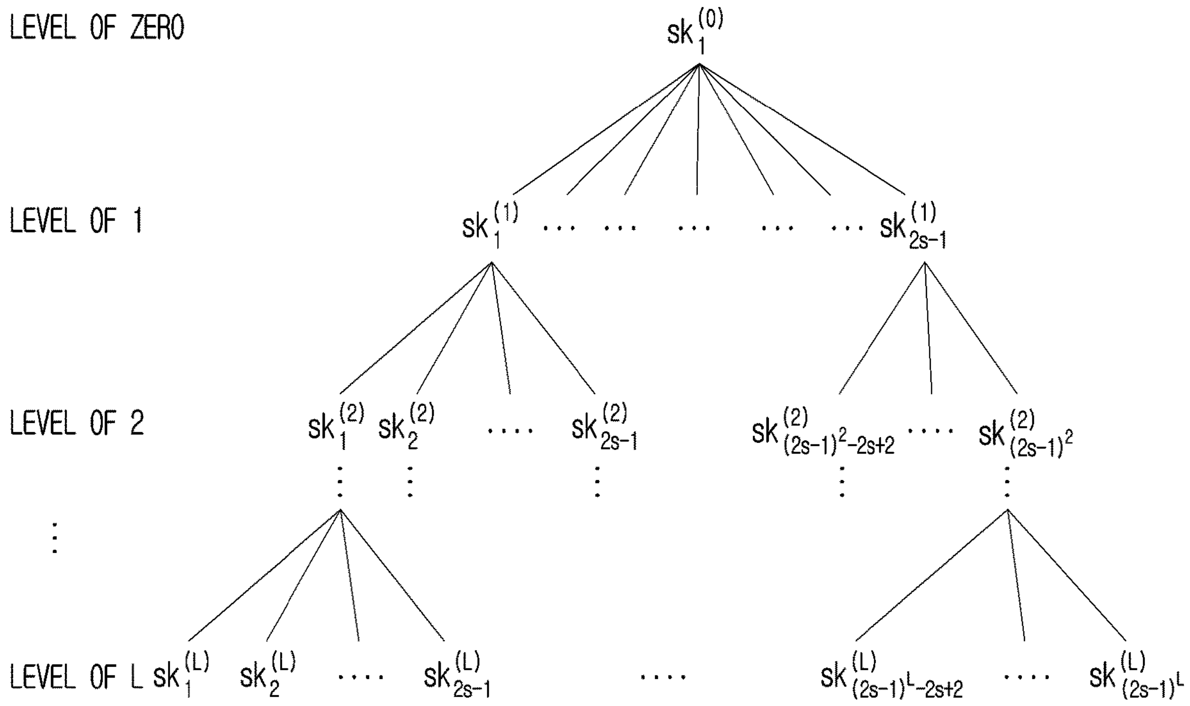
FIG. 6 is a view for explaining the t-out-of-N secret sharing scheme according to an embodiment of the present disclosure.

FIG. 6 is a view for explaining the t-out-of-N secret sharing scheme according to an embodiment of the present disclosure.

Referring to FIG. 6, the processor 130 may set the secret key to a secret share $$sk_1^{(0)}$$

corresponding to the level of zero. In addition, the processor 130 may use Shamir's secret sharing scheme of s-out-of-(2s−1) to thus segment the secret share $$sk_1^{(0)}$$

corresponding to the level of zero into 2s−1 secret shares $$sk_1^{(1)}, \ldots, sk_{2s-1}^{(1)},$$

thereby generating the 2s−1 secret shares corresponding to the level of 1.

In addition, the processor 130 may use Shamir's secret sharing scheme of s-out-of-(2s−1) to thus segment each of the secret shares $$sk_1^{(1)}, \ldots , sk_{2s-1}^{(1)}$$

corresponding to the level of 1 into 2s−1 secret shares, thereby generating $(2s-1)^2$ secret shares corresponding to the level of 2.

For example, the processor 130 may use Shamir's secret sharing scheme of s-out-of-(2s−1) to thus segment the secret share $$sk_1^{(1)}$$

corresponding to the level of 1 into 2s−1 secret shares $$sk_1^{(2)}, sk_2^{(2)}, \ldots , sk_{2s-1}^{(2)}, \ldots ,$$

and may use Shamir's secret sharing scheme of s-out-of-(2s−1) to thus segment the secret share $$sk_{2s-1}^{(1)}$$

corresponding to the level of 1 into 2s−1 secret shares $$sk_{(2s-1)^2-2s+2}^{(2)}, \ldots , sk_{(2s-1)^2}^{(2)},$$

thereby generating $(2s-1)^2$ secret shares corresponding to the level of 2.

The processor 130 may generate $(2s-1)^L$ secret shares corresponding to the level of L by repeating this process.

For example, the processor 130 may use Shamir's secret sharing scheme of s-out-of-(2s−1) to thus segment a secret share $$sk_1^{(L-1)}$$

corresponding to a level of (L−1) into 2s−1 secret shares $$sk_1^{(L)}, sk_2^{(L)}, \ldots , sk_{2s-1}^{(L)}, \ldots ,$$

and may use Shamir's secret sharing scheme of s-out-of-(2s−1) to thus a segment secret share $$sk_{(2s-1)^{(L-1)}}^{(L-1)}$$

corresponding to the level of (L−1) into 2s−1 secret shares $$sk_{(2s-1)^L-2s+2}^{(L)}, \ldots , sk_{(2s-1)^L}^{(L)},$$

thereby generating $(2s-1)^L$ secret shares corresponding to the level of L.

As described above, according to the present disclosure, the electronic device 100 may use the t-out-of-N secret sharing scheme configured by repeating Shamir's secret sharing scheme of s-out-of-(2s−1), thereby generating the plurality of secret shares from the secret key. This secret sharing scheme may be referred to as the tree-secret sharing scheme (TreeSSS) (or the t-out-of-N TreeSSS).

In operation S430, the processor 130 may transmit the plurality of secret shares corresponding to the level of L to N electronic devices through the communication device 110.

The electronic device to which the secret share is transmitted may be various types of electronic devices. For example, the electronic devices may include the servers, the smartphones, the tablets, the game players, the PCs, the laptop PCs, the home servers, the kiosks, the home appliances each having the IoT function, and the like.

Transmitting the plurality of secret shares corresponding to the level of L to the N electronic devices may indicate distributing the plurality of secret shares corresponding to the level of L to the users, that is, the N parties of the N electronic devices. In this case, the processor 130 may randomly distribute the plurality of secret shares corresponding to the level of L to the N parties.

For example, the processor 130 may transmit at least one secret share randomly selected from the plurality of secret shares corresponding to the level of L to the electronic device of the party to which the secret share is distributed. In this case, the secret share distributed to one party may not be duplicated and distributed to another party.

Figure 7:
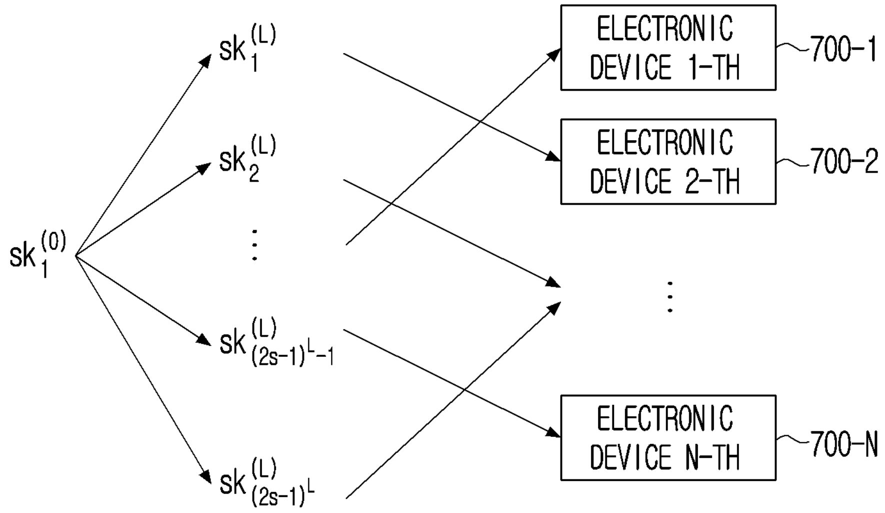
FIG. 7 is a view for explaining an example of secret key distribution according to an embodiment of the present disclosure.

Referring to FIG. 7, according to the t-out-of-N secret sharing scheme of the present disclosure, the processor 130 may generate the $(2s-1)^L$ secret shares $$sk_1^{(L)}, sk_2^{(L)}, \ldots , sk_{(2s-1)^L-1}^{(L)}, sk_{(2s-1)^L}^{(L)}$$

corresponding to the level of L from the secret share $$sk_1^{(0)}$$

(e.g., secret key sk) corresponding to the level of zero, and randomly transmit the $(2s-1)_L$ secret shares to electronic devices 700-1, 700-2, . . . , and 700-N of the N parties. Accordingly, the plurality of secret shares corresponding to the level of L may be distributed to the N parties.

Meanwhile, in the above example, the electronic device 100 is described as distributing the plurality of secret shares corresponding to the level of L to the N parties, and is not limited thereto. For example, the user of the electronic device 100 may be included in the N parties. In this case, the electronic device 100 may distribute, to N−1 parties, the other secret shares excluding the secret share distributed to the party of the electronic device 100 among the plurality of secret shares corresponding to the level of L.

In the t-out-of-N secret sharing scheme according to the present disclosure, the secret key may be recovered using the plurality of secret shares distributed to the t or more parties among the N parties. Hereinafter, the description describes a method of recovering the secret key by using a 3-out-of-5 secret sharing scheme according to an example of the present disclosure, which is configured by repeating Shamir's secret sharing scheme of 2-out-of-3.

Shamir's secret sharing scheme of 2-out-of-3 are denoted as SS(3,2), and five parties to whom the secret shares are distributed are denoted as $P_1$, $P_2$, . . . , and $P_5$.

In the 3-out-of-5 secret sharing scheme, the secret key may be recovered using the secret shares distributed to three or more of the five parties.

For example, in the 3-out-of-5 secret sharing scheme according to the present disclosure, SS(3,2) may be applied to the secret key sk and sk may be segmented by $$sk_1^{(1)}, sk_2^{(1)}, sk_3^{(1)}.$$

In addition, the processor 130 may repeatedly applying SS(3,2) to the secret share to thus segment by $$sk_i^{(1)}$$

by $$\{sk_{3i-2}^{(2)}, sk_{3i-1}^{(2)}, sk_{3i}^{(2)}\}$$

and segment $$sk_j^{(2)}$$

by $$\{sk_{3j-2}^{(3)}, sk_{3j-1}^{(3)}, sk_{3j}^{(3)}\}.$$

In addition, the processor 130 may distribute the secret share, that is, $$\{sk_j^{(3)}\}j \in \{1, \dots 27\}$$

corresponding to a level of 3 to the five parties.

For example, the secret share distributed to $P_1$ may be $$\{sk_1^{(3)}, sk_6^{(3)}, sk_{11}^{(3)}, sk_{16}^{(3)}, sk_{21}^{(3)}, sk_{26}^{(3)}\},$$

the secret share distributed to $P_2$ may be $$\{sk_3^{(3)}, sk_8^{(3)}, sk_{13}^{(3)}, sk_{18}^{(3)}, sk_{23}^{(3)}\},$$

the secret share distributed to $P_3$ may be $$\{sk_2^{(3)}, sk_7^{(3)}, sk_{12}^{(3)}, sk_{17}^{(3)}, sk_{22}^{(3)}, sk_{27}^{(3)}\},$$

the secret share distributed to $P_4$ may be $$\{sk_4^{(3)}, sk_9^{(3)}, sk_{14}^{(3)}, sk_{19}^{(3)}, sk_{24}^{(3)}\},$$

and the secret share distributed to $P_5$ may be $$\{sk_5^{(3)}, sk_{10}^{(3)}, sk_{15}^{(3)}, sk_{20}^{(3)}, sk_{25}^{(3)}\}.$$

In this case, the secret shares distributed to three or more parties out of the five parties may be required, and the secret key sk is unable to be recovered only with the secret shares distributed to two or less parties to recover the secret key sk.

For example, $$\{sk_2^{(2)}, sk_3^{(2)}, sk_5^{(2)}, sk_7^{(2)}, sk_8^{(2)}\}$$

may be recovered using the secret shares distributed to $\{P_2, P_4, P_5\}$, and $$\{sk_1^{(1)}, sk_3^{(1)}\}$$

may be recovered using $$\{sk_2^{(2)}, sk_3^{(2)}, sk_5^{(2)}, sk_7^{(2)}, sk_8^{(2)}\}.$$

In addition, the secret key sk may be recovered using $$\{sk_1^{(1)}, sk_3^{(1)}\}.$$

However, $$\{sk_1^{(2)}, sk_4^{(2)}, sk_6^{(2)}, sk_9^{(2)}\}$$

may be restored using the secret shares distributed to $\{P_1, P_3\}$, and only $$\{sk_2^{(1)}\}$$

may be recovered using $$\{sk_1^{(2)}, sk_4^{(2)}, sk_6^{(2)}, sk_9^{(2)}\}.$$

Therefore, the secret key sk is unable to be recovered only with the secret shares distributed to $\{P_1, P_3\}$. In addition, due to a privacy property of Shamir's secret sharing scheme, any information on the secret key sk is unable to be obtained only with the secret shares distributed to $\{P_1, P_3\}$.

In the TFHE that is based on the t-out-of-N secret sharing scheme according to the present disclosure, the plaintext may be obtained by using the secret shares distributed to t parties among the N parties (in detail, the t or more parties) to thus decrypt the homomorphically encrypted message.

For example, the electronic device may receive the plurality of secret shares from t electronic devices (that is, the t parties), and decrypt the encrypted message by using the received plurality of secret shares to thus obtain the plaintext. In this case, the electronic device decrypting the encrypted message may include the electronic device 100, any one of the N electronic devices, or the server (e.g., first server device 200 or second server device 300).

Hereinafter, assume that the electronic device decrypting the encrypted message is the electronic device 100.

Here, each of the t electronic devices among the N electronic devices may include the error in the secret share and transmit the secret share including the error to the electronic device 100.

The processor 130 may receive the plurality of secret shares each including the error from the t electronic devices through the communication device 110, and decrypt the homomorphically encrypted message based on the received plurality of secret shares.

According to the present disclosure, it is possible to ensure the stability of the message in that the encrypted message may be decrypted even when the message is transmitted including the error included in the secret share in a case where the party transmits the secret share distributed to the party himself/herself to another party.

Hereinafter, the description describes a method of decrypting the encrypted message by using the secret key distributed by means of the secret sharing scheme according to the present disclosure.

For example, for 1≤i≤SL, when $$\{\text{share}_k^{(i)}\}$$

may be restored by $$T(i) = \{k \mid \{\text{share}_j^{(L)}\} j \in T(L),$$

the secret key sk may be expressed as Equation 10 below.

$$\begin{aligned} sk &= \text{share}^{(0)} \\ &= \sum_{j_1 \in T^{(1)}} \lambda_{j_1}^{S_{j_1}^{(1)}} \cdot \text{share}_{j_1}^{(1)} \\ &= \sum_{j_2 \in T^{(2)}} \lambda_{j_1}^{S_{j_1}^{(1)}} \cdot \lambda_{j_2}^{S_{j_2}^{(2)}} \cdot \text{share}_{j_2}^{(2)} \\ &\dots \\ &= \sum_{j_L \in T^{(L)}} \lambda_{j_1}^{S_{j_1}^{(1)}} \dots \lambda_{j_{L-1}}^{S_{j_{L-1}}^{(L-1)}} \cdot \lambda_{j_L}^{S_{j_L}^{(L)}} \cdot \text{share}_{j_L}^{(L)} \end{aligned} \quad \text{[Equation 10]}$$

Here, $j_k$ indicates an index of the secret share corresponding to a level of k that uses $$\text{share}_j^{(L)}$$

for its recovery, $$S_{j_k}^{(k)}$$

indicates a set of the secret shares corresponding to the level of k, including $$\text{share}_{j_k}^{(k)}$$

recovering a secret share $$\text{share}_{j_{k-1}}^{(k-1)}$$

corresponding to a level of (k−1), and $$\lambda_{j_k}^{S_{j_k}^{(k)}}$$

indicates a Lagrange coefficient which may be obtained from a Lagrange polynomial of Shamir's secret sharing scheme of s-out-of-(2s−1).

Meanwhile, decryption (FEE.Dec) of the homomorphic encryption has a linear property, and partial decryption $$\hat{p}_{j_L}^{(L)}$$

using the distributed secret key may thus satisfy Equation 11 below.

$$\begin{aligned} &\sum_{j_L \in T^{(L)}} \lambda_{j_1}^{S_{j_1}^{(1)}} \dots \lambda_{j_{L-1}}^{S_{j_{L-1}}^{(L-1)}} \cdot \lambda_{j_L}^{S_{j_L}^{(L)}} \cdot \hat{p}_{j_L}^{(L)} = \\ &\sum_{j_L \in T^{(L)}} \lambda_{j_1}^{S_{j_1}^{(1)}} \dots \lambda_{j_{L-1}}^{S_{j_{L-1}}^{(L-1)}} \cdot \lambda_{j_L}^{S_{j_L}^{(L)}} \cdot \\ &\left(FHE.Dec\left(\text{share}_{j_L}^{(L)}, ct\right) + ((2s-1)!)^L e_{j_L}\right) = \\ &FHE.Dec\left(\sum_{j_L \in T^{(L)}} \lambda_{j_1}^{S_{j_1}^{(1)}} \dots \lambda_{j_{L-1}}^{S_{j_{L-1}}^{(L-1)}} \cdot \lambda_{j_L}^{S_{j_L}^{(L)}} \cdot \text{share}_{j_L}^{(L)}, ct\right) + \\ &\sum_{j_L \in T^{(L)}} \lambda_{j_1}^{S_{j_1}^{(1)}} \dots \lambda_{j_{L-1}}^{S_{j_{L-1}}^{(L-1)}} \cdot \lambda_{j_L}^{S_{j_L}^{(L)}} \cdot ((2s-1)!)^L e_{j_L} = \\ &FHE.Dec(sk, ct) + \sum_{j_L \in T^{(L)}} \lambda_{j_1}^{S_{j_1}^{(1)}} \dots \lambda_{j_{L-1}}^{S_{j_{L-1}}^{(L-1)}} \cdot \lambda_{j_L}^{S_{j_L}^{(L)}} \cdot ((2s-1)!)^L e_{j_L} \end{aligned} \quad \text{[Equation 11]}$$

Referring to Equation 11, it may be seen that if an error part (term)

$$\sum_{j_L \in T^{(L)}} \lambda_{j_1}^{s_{j_1}^{(1)}} \ldots \lambda_{j_{L-1}}^{s_{j_{L-1}}^{(L-1)}} \cdot \lambda_{j_L}^{s_{j_L}^{(L)}} \cdot ((2s-1)!)^L e_{j_L}$$

is appropriately limited, the plaintext is recovered using the secret share including the error.

Table 1 below is a table for comparing the secret key distribution method using the secret sharing scheme according to the present disclosure and the secret key distribution method using a conventional secret sharing scheme.

TABLE 1

| Secret Sharing Scheme | structure | O (log q) | # of keys |
|---|---|---|---|
| Sharmir SS | t-out-of-N | O (NlogN) | N |
| {0,1}-LSSS | t-out-of-N | O (logN) | $O(N^{5.3})$ |
| TreeSSS-SS (2s-1, s) | t-out-of-N | O (slogs·logN) = O (logN) | $O\left(N^{3+\frac{2.3}{logs}}\right)$ |

In Table 1, Shamir SS and {0, 1}-LSSS indicate the conventional secret sharing schemes, Shamir SS indicates Shamir's secret sharing scheme, and {0, 1}-LSSS indicates {0, 1}-linear secret sharing scheme. In addition, in Table 1, TrssSSS-SS (2s−1, s) indicates the secret sharing scheme according to the present disclosure, which is configured by repeating Shamir's secret sharing scheme of s-out-of-(2s−1).

A structure of these schemes is “t-out-of-N”.

In addition, in Table 1, O(log q) indicates a bit size of the encrypted message, and # of keys indicates a total number of the secret shares generated using the secret sharing scheme.

The Shamir's secret sharing-based TFHE may use rational numbers known as the Lagrange coefficients. The feature requires a large scaling factor. For example, the scaling factor may be $O(N!^2)$. Therefore, the encrypted message generated using the Shamir-based TFHE may not have a compact size. For example, the encrypted message may have a bit size of O(N log N).

However, the encrypted message generated using the TrssSSS-based TFHE according to the present disclosure may have a bit size of O(log N). Accordingly, the encrypted message generated using the TFHE that is based on the TrssSSS according to the present disclosure may have a more compact size than the Shamir's secret sharing-based TFHE.

{0, 1}-LSSS-based TFHE may adopt the secret sharing scheme of a monotone Boolean formula. The {0,1}-LSSS-based TFHE may provide the encrypted message size having the compact size by using binary coefficients instead of the Lagrange coefficients used in the Shamir scheme. However, the {0, 1}-LSSS-based TFHE may have a large total number of the secret shares generated using the secret sharing scheme. In this case, the {0, 1}-LSSS-based TFHE may have a higher communication cost for the decryption in that the communication cost for the decryption is calculated as a product of the size of the encrypted message and the total number of the secret shares.

However, the total number of the secret shares generated by the secret sharing scheme in the TrssSSS-based TFHE according to the present disclosure is $$O\left(N^{3+\frac{2.3}{logs}}\right).$$

Therefore, the total number of the secret shares generated using the secret sharing scheme in the TrssSSS-based TFHE according to the present disclosure is smaller than the {0, 1}-LSSS-based TFHE. Therefore, the TrssSSS-based TFHE according to the present disclosure may ensure a lower communication cost than the {0, 1}-LSSS-based TFHE.

Meanwhile, in the above-described example, the electronic device 100 (e.g., one electronic device among the plurality of electronic devices 100-1 to **100-*n* shown in FIG. 1) is described as distributing the secret keys, and the present disclosure is not limited thereto. For example, the first server device 200 or the second server device 300** may distribute the secret keys by using the secret sharing scheme described above.

Meanwhile, the various embodiments of the present disclosure may be implemented in a computer or a computer-readable recording medium using software, hardware, or a combination of software and hardware. In some cases, the embodiments described in the specification may be implemented by the processor itself. According to a software implementation, the embodiments such as the procedures and functions described in the specification may be implemented by separate software modules. Each of the software modules may perform one or more functions and operations described in the specification.

Meanwhile, computer instructions for performing processing operations of the electronic device according to the various embodiments of the present disclosure described above may be stored in a non-transitory computer-readable medium. The computer instructions stored in the non-transitory computer-readable medium may allow a specific device to perform the processing operations of the electronic device 100 according to the various embodiments described above if based on the computer instructions are executed by a processor of the specific device.

The non-transitory computer-readable medium is not a medium that stores data therein for a while, such as a register, a cache, or a memory, and indicates a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

Although the embodiments are shown and described in the present disclosure as above, the present disclosure is not limited to the above-mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. An electronic device which distributes secret keys by using a t-out-of-N secret sharing scheme, the device comprising:

a communication device;

a memory storing the secret key; and a processor configured to generate a plurality of secret shares corresponding to a level of 1 by segmenting the secret key corresponding to a level of zero based on a predetermined secret sharing scheme, generate a plurality of secret shares corresponding to a level of L by repeatedly performing a process of generating a plurality of secret shares corresponding to a next level by segmenting the plurality of secret shares each corresponding to the respective levels ranging from the level of 1 based on the predetermined secret sharing scheme, and transmit the plurality of secret shares corresponding to the level of L to N electronic devices through the communication device, wherein for each integer i satisfying $1 \leq i \leq L$, the processor is configured to generate the plurality of secret shares corresponding to level i by, for each secret share corresponding to level i-1, generating a polynomial having the secret share corresponding to level i-1 as a constant term and having randomly selected coefficients, and generating secret shares corresponding to level i as values of the polynomial.

2. The device as claimed in claim 1, wherein the predetermined secret sharing scheme is Shamir's secret sharing scheme of s-out-of-(2s−1).

3. The device as claimed in claim 2, wherein $$L \geq \log_{c_s}(N) + \log_s(N) + O(1),$$

wherein N is the number of the electronic devices, L is a positive integer indicating the level, s is a parameter of Shamir's secret sharing scheme of s-out-of-(2s−1), $C_s$ is defined as $$c_s = \frac{2s-1}{2^{2s-2}} \cdot \binom{2s-2}{s-1}.$$

and O(1) denotes a term bounded by a constant independent of N.

4. The device as claimed in claim 1, wherein the secret key is a secret key of a homomorphically encrypted message.

5. The device as claimed in claim 4, wherein each of t electronic devices among the N electronic devices transmits the secret share including an error to the electronic device, and the processor is configured to receive the plurality of secret shares each including the error from the t electronic devices through the communication device, and decrypt the homomorphically encrypted message based on the received plurality of secret shares.

6. A method for distributing secret keys in which a t-out-of-N secret sharing scheme is used, the method comprising:

generating a plurality of secret shares corresponding to a level of 1 by segmenting a secret key corresponding to a level of zero based on a predetermined secret sharing scheme;

generating a plurality of secret shares corresponding to a level of L by repeatedly performing a process of generating a plurality of secret shares corresponding to a next level by segmenting the plurality of secret shares each corresponding to the respective levels ranging from the level of 1 based on the predetermined secret sharing scheme; and transmitting the plurality of secret shares corresponding to the level of L to N electronic devices, wherein the generating a plurality of secret shares comprises:

for each integer i satisfying $1 \leq i \leq L$, generating the plurality of secret shares corresponding to level i by, for each secret share corresponding to level i-1, generating a polynomial having the secret share corresponding to level i-1 as a constant term and having randomly selected coefficients, and generating secret shares corresponding to level i as values of the polynomial.

7. The method as claimed in claim 6, wherein the predetermined secret sharing scheme is Shamir's secret sharing scheme of s-out-of-(2s−1).

8. The method as claimed in claim 7, wherein $$L \geq \log_{c_s}(N) + \log_s(N) + O(1),$$

wherein N is the number of the electronic devices, L is a positive integer indicating the level, s is a parameter of Shamir's secret sharing scheme of s-out-of-(2s−1), $C_s$ is defined as $$c_s = \frac{2s-1}{2^{2s-2}} \cdot \binom{2s-2}{s-1}$$

and O(1) denotes a term bounded by a constant independent of N.

9. The method as claimed in claim 6, wherein the secret key is a secret key of a homomorphically encrypted message.

10. The method as claimed in claim 9, in which each of t electronic devices among the N electronic devices transmits the secret share including an error to the electronic device, further comprising receiving the plurality of secret shares each including the error from the t electronic devices, and decrypting the homomorphically encrypted message based on the received plurality of secret shares.

* * * * *